US010656857B2

(12) United States Patent
Hallak et al.

(10) Patent No.: US 10,656,857 B2
(45) Date of Patent: May 19, 2020

(54) STORAGE SYSTEM INDEXED USING PERSISTENT METADATA STRUCTURES

(71) Applicant: Vast Data Ltd., Tel Aviv (IL)

(72) Inventors: Renen Hallak, Tenafly, NJ (US); Asaf Levy, Tel Aviv (IL); Avi Goren, Tel Aviv (IL); Yogev Vaknin, Karkur (IL); Vladimir Zdornov, Kfar Saba (IL)

(73) Assignee: Vast Data Ltd., Tel Aviv (IL)

( * ) Notice: Subject to any disclaimer, the term of this patent is extended or adjusted under 35 U.S.C. 154(b) by 0 days.

(21) Appl. No.: 16/002,804

(22) Filed: Jun. 7, 2018

(65) Prior Publication Data

US 2019/0377491 A1    Dec. 12, 2019

(51) Int. Cl.
| | |
|---|---|
| *G06F 11/14* | (2006.01) |
| *G06F 3/06* | (2006.01) |
| *G06N 7/08* | (2006.01) |
| *G06F 16/907* | (2019.01) |
| *G06F 16/901* | (2019.01) |

(52) U.S. Cl.
CPC .............. *G06F 3/064* (2013.01); *G06F 3/067* (2013.01); *G06F 3/0619* (2013.01); *G06F 16/907* (2019.01); *G06F 16/9014* (2019.01); *G06F 16/9027* (2019.01); *G06N 7/08* (2013.01); *G06F 11/1456* (2013.01)

(58) Field of Classification Search
None
See application file for complete search history.

(56) References Cited

U.S. PATENT DOCUMENTS

| | | | |
|---|---|---|---|
| 7,213,021 | B2 | 5/2007 | Taguchi et al. |
| 8,661,175 | B2 | 2/2014 | Sundrani et al. |
| 2006/0248245 | A1 | 11/2006 | Ninomiya et al. |
| 2010/0268904 | A1 | 10/2010 | Sheffield et al. |
| 2010/0274772 | A1 | 10/2010 | Samuels |
| 2014/0115579 | A1 | 4/2014 | Kong |
| 2016/0239239 | A1 | 8/2016 | Tin et al. |
| 2016/0350325 | A1 | 12/2016 | Wang et al. |
| 2017/0090779 | A1 | 3/2017 | Barzik et al. |
| 2017/0147497 | A1 | 5/2017 | Phelan et al. |
| 2017/0149890 | A1 | 5/2017 | Shamis et al. |
| 2017/0220506 | A1 | 8/2017 | Brown et al. |
| 2017/0251058 | A1 | 8/2017 | Zachariassen et al. |
| 2017/0286144 | A1 | 10/2017 | Barzik et al. |
| 2018/0198765 | A1* | 7/2018 | Maybee ................ G06F 21/602 |
| 2018/0253255 | A1* | 9/2018 | Jain ....................... G06F 3/0641 |

* cited by examiner

*Primary Examiner* — Brian R Peugh
(74) *Attorney, Agent, or Firm* — M&B IP Analysts, LLC

(57) ABSTRACT

A storage system. The storage system includes: a data store including a plurality of data blocks; and an element store, the element store including a plurality of element trees, wherein each element tree includes a plurality of metadata blocks containing pointers, wherein each pointer points to one of the plurality of metadata blocks or to one of the data blocks, wherein data of the plurality of data blocks is read by navigating at least one of the plurality of element trees.

12 Claims, 7 Drawing Sheets

STORAGE SYSTEM INDEXED USING PERSISTENT METADATA STRUCTURES

TECHNICAL FIELD

The present disclosure relates generally to data storage, and more particularly to indexing data in a storage.

BACKGROUND

Distributed file systems store data on remote servers that are accessible to users via networks. From the user's perspective, files shared via a distributed file system appear to be accessed as if the user were receiving files from a local storage system. Additional storage capacity may be added by increasing the number of servers on which data is stored. Distributed file systems are typically designed for transparency, heterogeneity, and scalability. This allows for convenient, secure sharing of files among nodes of a network with flexible deployment.

Distributed file systems can store large amounts of data across different storage systems. To allow access to any given portion of data, the data must be properly indexed. However, existing solutions for indexing data in distributed storage systems face many challenges. These challenges can result in inefficiencies in performing access commands as well as issues caused by the underlying hardware.

One challenge faced by distributed storage systems is caused due to coupling of computing and storage resources. In existing distributed storage systems, each server includes both persistent storage resources as well as computing resources (e.g., CPU, RAM, etc.). To increase the number of either computing or storage resources, the other must also be increased. Also, when non-persistent memory (e.g., RAM) of a storage server fails, any metadata that is stored therein is lost and, as a result, data mapped by the indexing metadata becomes inaccessible at least until the metadata is reconstructed.

Another challenge for distributed storage systems occurs in ensuring consistency during concurrent access operations. To this end, existing solutions may implement locking in order to prevent accessing the same data at the same time. However, locking introduces many issues such as lock overhead, lock contention, and deadlocks. Each of these issues becomes more likely to occur as the distributed storage system scales up, thereby decreasing performance (e.g., speed of access, use of memory for locks, etc.).

One more challenge for distributed storage systems is related to managing hardware costs of the system as compared to performance. Different types of storage hardware may be more expensive than others but provide better performance. Balancing these results requires selecting suitable storages for both the metadata and data stored in the storages. For large scale implementations, high performing storages may be needed to provide adequate performance. But use of many high performing storages can be prohibitively expensive. For example, persistent storage technologies such as Flash and NVRAM provide reliable and fast alternatives as compared to traditional magnetic hard drives and can ensure a high number of write-erase cycles but cost significantly more.

Due to these and other challenges, performance of distributed file systems fails to scale appropriately as the distributed file systems are scaled. At some point, further scaling is effectively no longer possible.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

The storage system includes: a data store including a plurality of data blocks; and an element store, the element store including a plurality of element trees, wherein each element tree includes a plurality of metadata blocks containing pointers, wherein each pointer points to one of the plurality of metadata blocks or to one of the data blocks, wherein data of the plurality of data blocks is read by navigating at least one of the plurality of element trees.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
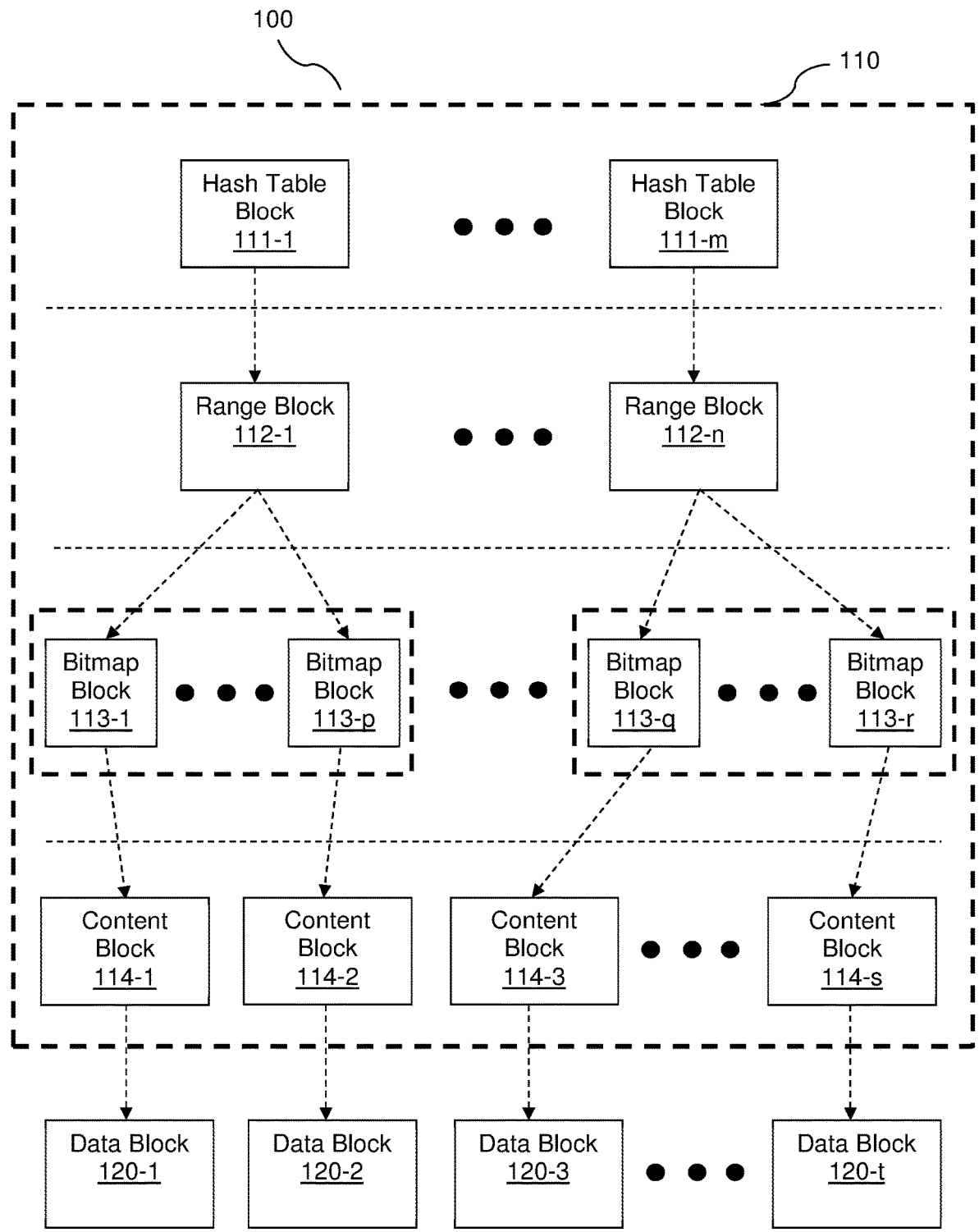
FIG. 1 is a virtualization model of an element store utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include a storage system indexed using persistent metadata structures. An element store is populated with element trees. Each element tree is a direct acyclic graph representing an element and includes metadata blocks that are persistent metadata structures. An element is a dataset such as, but not limited to, a file, a directory, an object, and the like. At least some of the metadata blocks include pointers to other metadata blocks, thereby allowing for forming element trees. In some implementations, the metadata includes timestamps indicating times at which portions of an element tree changed.

In an embodiment, the bottom level of the element store may be shared among different element trees to reduce metadata space, to improve locality when deleting snapshots, and the like. A new element and, accordingly, a new element tree representing the element, may be created, for example, upon client request.

Each element is a logical unit that has a handle, which is a unique identifier. An element may include an attribute store and an element data store. Example elements include, but are not limited to, files, directories, objects, buckets, and volumes (e.g., Amazon® Elastic Block Storage volume). The attribute store includes attributes of the element, which may include pointers to other elements as included in the metadata blocks. The element data store allows for writing to and reading from data included in the element.

Because the metadata blocks may include pointers to other blocks, the element trees are able to grow dynamically as the storage grows to allow for flexible deployment. The root of each element tree is stored in a global hash table distributed among storage nodes. Consistent hashing is performed to allow the global hash table to grow as the storage grows.

The metadata blocks are allocated from a shared pool, thereby allowing for different numbers and sizes of elements. For example, one element may have a size corresponding to that of the entire space of the physical layer, or billions of elements may each have a size corresponding to only a fraction of the space such that they collectively utilize the entire space of the physical layer. Further, different elements in the element store may be different sizes.

The disclosed embodiments provide techniques for indexing data using persistent metadata structures included in element trees. The various disclosed embodiments also allow for reduced use of storage space for indexing and increased efficiency of implementing access commands on the data blocks. This in turn allows for more scalability as compared to existing solutions as well as convenient exchanges of storage hardware. Various disclosed embodiments also minimize lock contention by requiring locks only for write operations and locking at the metadata block level during writing rather than locking individual elements. In some embodiments, data stored in the blocks may be compressed to remove duplicate instances of the same handle.

The disclosed embodiments also allow for maintaining snapshots of stored data. Specifically, the element trees may include timestamps used to maintain content of the elements over time. The snapshots provide a view of the element store at different points in time. Accordingly, the disclosed embodiments may provide access to previous versions of the stored data. Further, in some embodiments, only relevant content blocks are read when accessing snapshots, thereby increasing efficiency of snapshot access.

FIG. 1 is an example virtualization model 100 according to an embodiment. The virtualization model 100 includes an element store 110 and data blocks 120. The element store 110 includes element trees of metadata blocks. The metadata blocks at the bottom level of the element store 110 point to the data blocks 120, which are locations in a physical storage. In an embodiment, the metadata blocks include hash table blocks 111, range blocks 112, bitmap blocks 113, and content blocks 114. The data blocks 120 are included in a data store 320.

In the example virtualization model 100 shown in FIG. 1, each element tree has a respective hash table block 111-1 through 111-m at its top level. Each hash table block 111 may point to one or more range blocks 112, each of which in turn points to a range of bitmap blocks 113. Each bitmap block 113 points to one or more content blocks 114, thereby forming a tree made up of a hash table block 111, range blocks 112, bitmap blocks 113, and content blocks 114. Additional blocks may be added on demand, for example as files are written or additional elements are created.

In an embodiment, the top level of the element store 110 includes the respective hash table blocks 111 of all elements. Each hash table block 111 includes a handle that is a unique identifier of its respective element and points to a range block 112. The hash table blocks further include global information such as latest attributes from the element, a locks list (i.e., identifying locks on blocks of the element's respective tree), or both.

Figure 3:
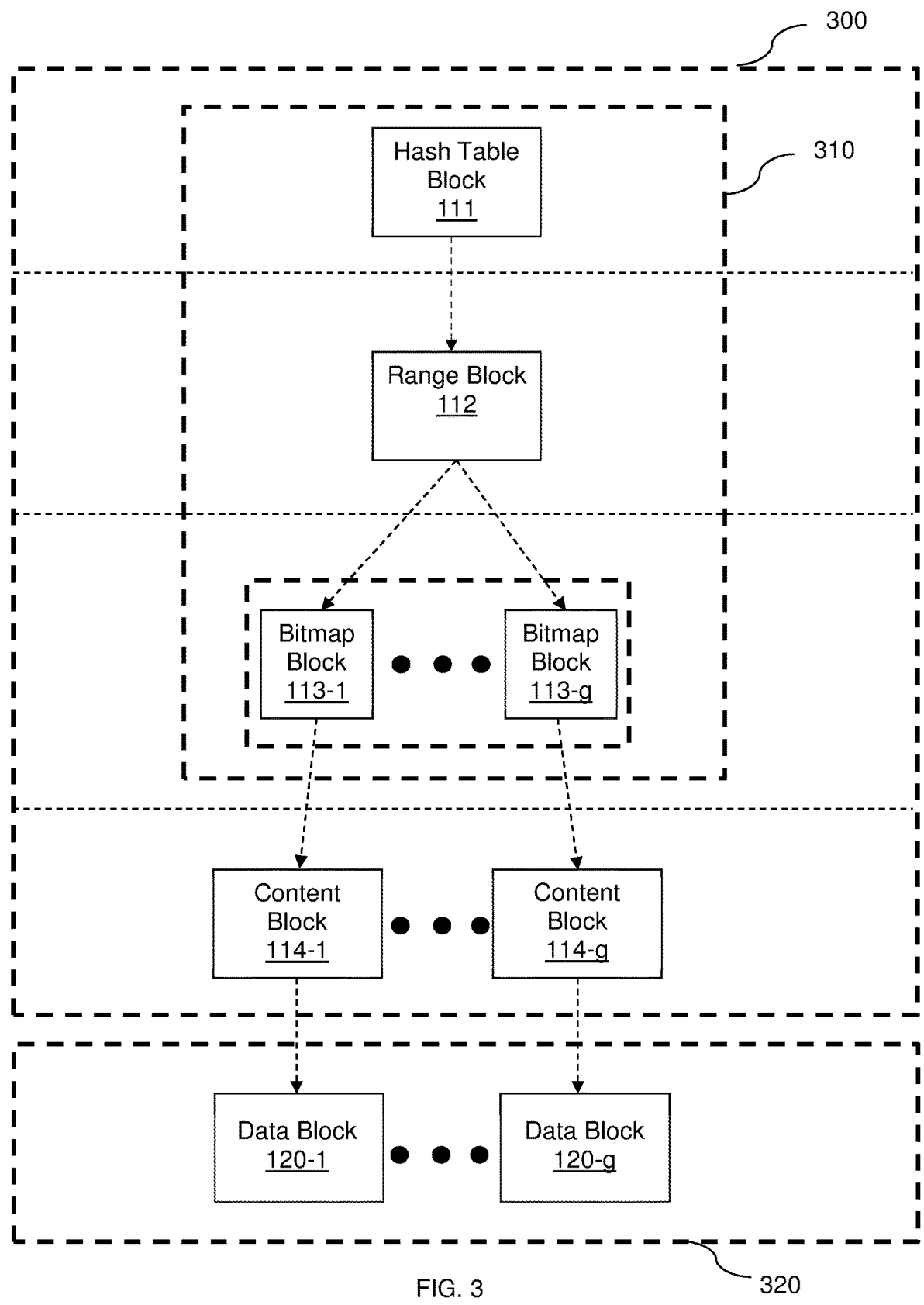
FIG. 3 is a virtualization model of an element tree utilized to describe various disclosed embodiments.

The hash table blocks 111 collectively provide for use of a hash table including composite blocks (e.g., the composite block 310 described further with respect to FIG. 3) for each element as buckets of the hash table. Specifically, each composite block of a hash table includes a hash table block 111 and its child blocks (e.g., range blocks 112 and bitmap blocks 113).

The hash table may be maintained as a consistent hash table by balancing portions of the hash table among storage nodes (e.g., the DNodes 534, FIG. 5) such that the storage nodes store equal portions of the hash table. When memory devices (e.g., 3D Xpoint devices) storing the hash table are added or removed, the hash table may be balanced among the remaining memory devices. The hash table includes the root of each element. Hash tables as a top level of an element store are described further herein below with respect to FIG. 3.

The range blocks 112 point to the bitmap blocks 113 using offset ranges such that each range block 112 points to one or more offset ranges that each include multiple bitmap blocks 113. When there are more bitmap blocks than there are available range block pointers for a first range block 112, a second range block 112 may be a child of the same hash table block 111 and point to a second range of the bitmap blocks 113. The range blocks 112 allow the element store 110 to have a high span out, i.e., a large number of children per block, because the range blocks can each point to a high number of child blocks. Further, each range block 112 may point to another range block 112 instead of or in addition to any of the bitmap blocks 113, thereby allowing the element store 110 to grow indefinitely as its respective element grows.

In an embodiment, each range block 112 is a container including tuples such as ranges and pointers, where each tuple describes a pointer to a child block. Each range may point to a location of a child block (e.g., an address of one of the bitmap blocks 113). The ranges may be, for example, byte ranges. As a non-limiting example, a 4-kilobyte range block can hold around 170 24-byte tuples and, therefore, can point to an equal amount (around 170) of children blocks.

In an embodiment, each bitmap block 113 is a container including tuples such as timestamps, data identifiers, and pointers. The timestamp is based on a consistent global (i.e., system-wide) counter that increments over time. The counter may advance, for example, at fixed intervals, each time a user request is received (e.g., a request to access data), and the like. The timestamps allow for creating snapshots of past versions of the element trees by correlating snaplines of specific times with the relevant timestamps. The data identifiers define which parts of data the bitmap block relates to, and the pointers are to respective child blocks (e.g., content blocks 114). In an embodiment, the data identifiers of a bitmap block 113 may include both a normal hash and a lowercase hash mapped to the normal hash. This allows for case insensitive lookup, i.e., the lowercase form of the hash may be found regardless of the pre-hash identifier. Each bitmap block 113 may be assigned a sequence number token based on its timestamp relative to other timestamps to allow for efficient comparisons of order when orders for acting on bitmap blocks must be determined (e.g., when multiple bitmap blocks are to be locked, they may be locked in order from earliest to latest).

In some implementations, the bitmap block 113 tuples may further include clone identifiers that are assigned to snapshots from different points in time. The clone identifiers allow for creating writeable copies, also referred to as clones, of elements from different points in time.

In an embodiment, updating the global counter includes creating a snapline for the element store 110 based on the bitmap blocks 113. Each snapline indicates contents of a portion of the metadata blocks at a point in time. The portion may include blocks of one or more elements. Because of the persistent nature of the metadata blocks, data of previous versions of the blocks are maintained when updated to add new data. The snaplines allow for efficiently reading block contents from different points in time.

The content blocks 114 include pointers to the data blocks 120. The content blocks 114 provide horizontal views of the respective snaplines that allow for efficient reading of the snaplines. Each of the content blocks 114 includes a range for a respective location in physical data and may be shared among different elements. Accordingly, the content blocks 114 further include element identifiers indicating which elements each content block 114 belongs to. In an example implementation, because the content blocks 114 consume more space than other blocks 111 through 113, the content blocks may be stored on Flash while the other blocks 111 through 113 are stored on XPoint to reduce costs of storage.

Data is read from the data blocks 120 by navigating the metadata blocks using their respective pointers. In an embodiment, a handle of the element is read from the hash table blocks 111 and one or more corresponding range blocks 112 is determined. This includes computing a hash function based on the hash table including the hash table blocks 111. A relevant bitmap block 113 is identified by scanning the ranges of the determined range blocks 112. The identified bitmap block 113 is read in order to identify a content block 114. The identified content block 114 is read to obtain a location of a data block 120, i.e., a location in a physical layer of storage. The data is read from the data block 120. When some of the metadata blocks are included in a composite block, the navigation includes reading the composite block to identify the next block to read.

In an embodiment, to avoid deadlocks, blocks are locked in the following order when taking multiple locks: bitmap blocks 112, hash table blocks 111, allocation blocks (i.e., blocks stored in a buffer), and content blocks 114. If locks on multiple elements must be taken, blocks of the elements may be locked from earliest to latest (e.g., as indicated by a sequence number of each element).

In an embodiment, different versions of the metadata blocks may be used for different kinds of data for elements. As an example, a first data version may be used for files and objects while a second name version may be used for directories and buckets. In this example, the data versions of the range blocks 112 contain data ranges, the date versions of the bitmap blocks 113 contain data hashes, and the data versions of the content blocks 114 contain data pointers, while the name versions of the range blocks 112 contain sorted text ranges, the name versions of the bitmap blocks 113 contain name hashes (e.g., for a directory the name bitmap block 113 may contain a hash of the name "abcd1234"), and the name versions of the content blocks 114 contain name pointers.

The tree 110 may grow and shrink as needed by splitting and merging blocks, respectively. This allows for dynamically adjusting the tree 110 to minimize wasted space due to empty metadata blocks. An example process for splitting blocks is described further herein below with respect to FIG. 7. The tree may shrink by merging when 2 or more blocks are sufficiently empty, for example when each of their contents are below a threshold total size. The merging may include writing data of the sufficiently empty blocks to a new merged block, deleting the sufficiently empty blocks, and updating their respective parents to point to the new merged block.

Figure 2:
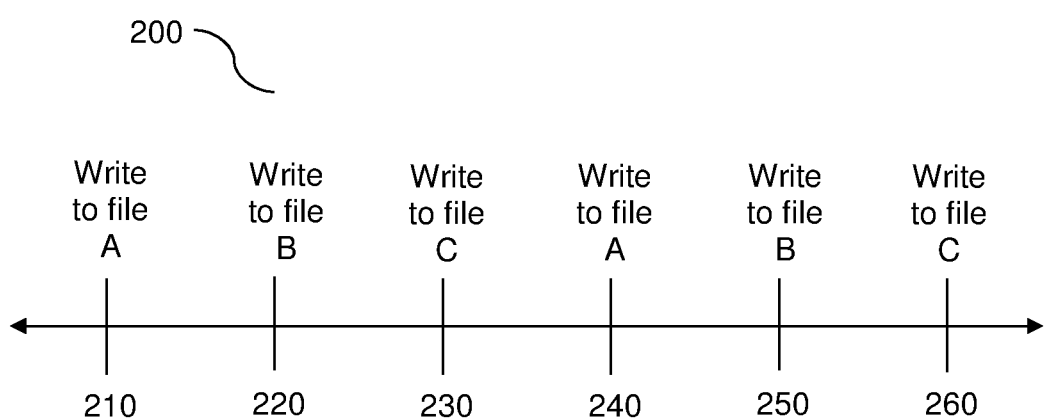
FIG. 2 is a timeline showing relative times of access operations performed on various files in a filesystem.

FIG. 2 is an example timeline 200 showing relative times of access operations performed on various files in a filesystem (not shown). In the example timeline 200, file A, file B, and file C are updated via writing at various points in time. File A is updated at points in time 210 and 240. File B is updated at points in time 220 and 250. File C is updated at points in time 230 and 260.

Elements stored in an element store of the filesystem include timestamps indicating the respective points in time 210 through 260. The timestamps may be derived from a global counter incremented by creating snaplines as described herein above. Thus, a snapshot for the filesystem shows a version of the element store at a particular point in time. As a non-limiting example, the view of the filesystem at the point in time 240 will illustrate that file A was written to twice and that files B and C were each written to once.

Note that FIG. 2 is shown with equal spacing between points in time 210, 220, 230 240, 250, and 260 merely for simplicity purposes. The example timeline 200 is utilized to show order of updates but not necessarily relative amounts of time between updates.

FIG. 3 is an example virtualization model of an element tree 300 according to an embodiment. The element tree 300 may be one of the element trees included in the element store 110, FIG. 1. The element tree 300 is a direct acyclic graph.

The element tree 300 includes a hash table block 111, a range block 112, bitmap blocks 113-1 through 113-g, and content blocks 114-1 through 114-g. It should be noted that, although the same number of bitmap blocks 113, content blocks 114, and data blocks 120 are shown in the example virtualization model of FIG. 3, different numbers of blocks may be utilized.

The composite block 310 is a metadata block containing the contents of multiple other metadata blocks. In an example implementation, the composite block 310 includes metadata blocks having a relatively small total size (e.g., below a threshold). In the example virtualization model of FIG. 3, the composite block 310 includes the hash table block 111, range block 112, and bitmap blocks 113. In an embodiment, the top level of an element store (e.g., the element store 110, FIG. 1) is a hash table where each entry in the table is a composite block 310.

By including metadata of multiple blocks in a single composite block 310 rather than in separate blocks, space utilization of the metadata blocks is reduced. Further, computing resources related to input/output (I/O) operations may be reduced because most of the element tree 300 can be navigated using a single I/O on the composite block 310 rather than multiple I/O operations on the separate blocks. Specifically, in an example implementation, an I/O operation is performed on the composite block 310, an I/O operation is performed on a content block 114 that is identified as a result of the I/O operation on the composite block 310, and an I/O operation is performed on a respective data block 120 pointed to by the identified content block 114. Thus, such use of a composite block allows for more efficient reading of data in a storage system such as the distributed storage system 530, FIG. 5.

It should be noted that the levels of the metadata blocks shown in FIGS. 1 and 3 are merely illustrative, and that the disclosed embodiments are not limited to the particular arrangements of or pointing among the metadata blocks shown in FIGS. 1 and 3. Element trees according to the disclosed embodiments may include more than one child for each block (or more than one range of children for one or more range blocks), and some blocks (e.g., the range blocks 112) may also point to other blocks of the same type (e.g., other range blocks 112) without departing from the scope of the disclosure.

Figure 4:
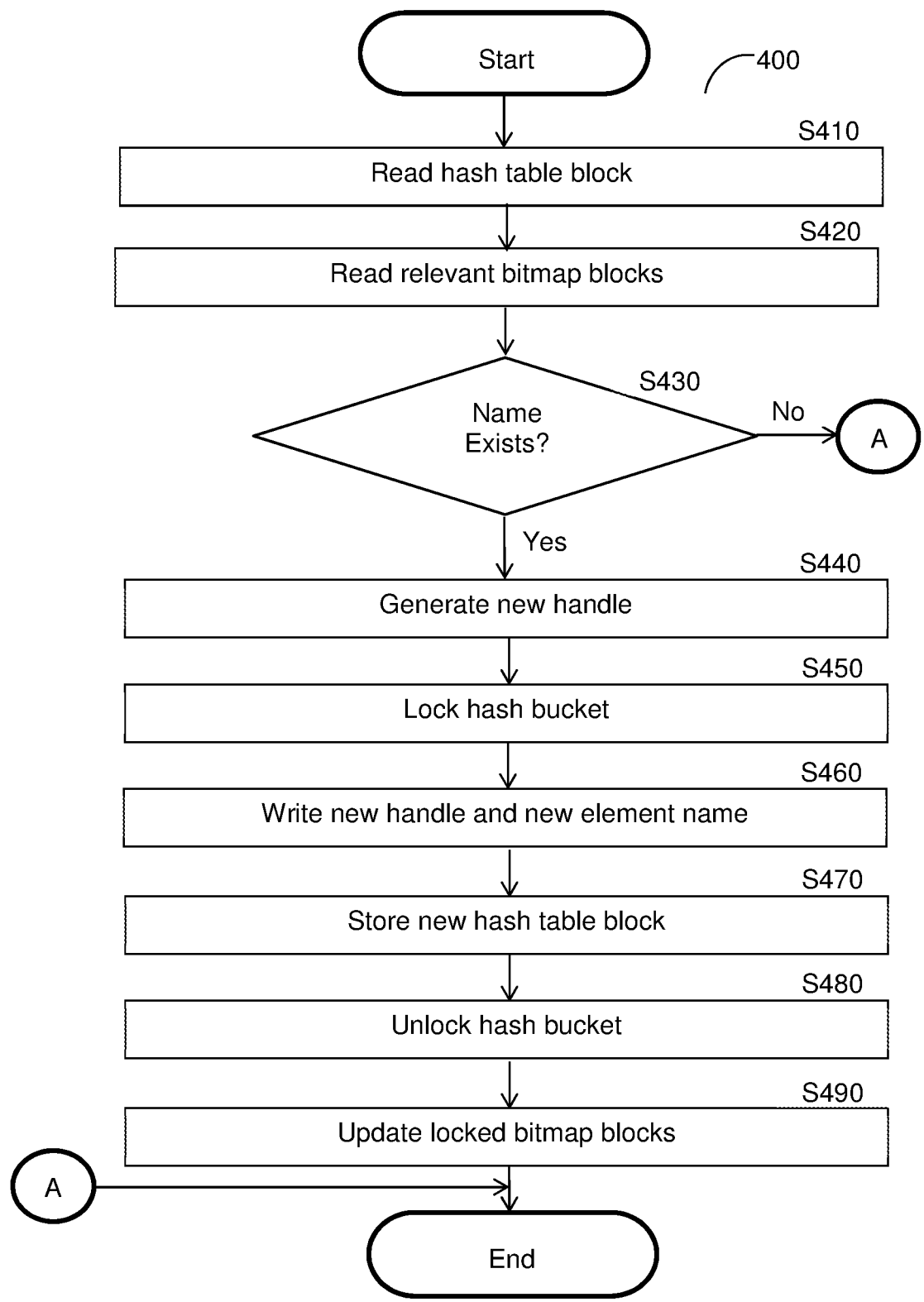
FIG. 4 is a flowchart illustrating a method for creating an element according to an embodiment.

FIG. 4 is an example flowchart 400 illustrating a method for creating an element according to an embodiment. The element to be created is to be a child of an existing parent element. The element store includes a hash table and a root handle, with element trees being added to the element store as new data is added to a storage system. Thus, an element tree representing the created element is added as a sub-tree to a main element tree including element trees of other elements of the element store.

At S410, a hash table block (e.g., one of the hash table blocks 111, FIG. 1) of the parent element is identified and read from a global hash table. In some implementations, S410 may further include verifying that the parent element is allowed to have children before proceeding.

At S420, one or more relevant bitmap blocks are read. In an embodiment, S420 includes identifying the relevant bitmap blocks based on the reading of the hash table block, locking the identified bitmap blocks, and reading from the locked bitmap blocks. In a further embodiment, S420 includes calculating both case sensitive and case insensitive name hashes based on the results of reading the hash table block. In such an embodiment, if the case sensitive and insensitive hashes correspond to different bitmap blocks, execution may proceed separately for the different bitmap blocks beginning with the bitmap block assigned the lowest token.

At S430, it is checked whether the name hash already exists and if so, execution continues with S440; otherwise, execution terminates.

At S440, when the name hash does not already exist, a new handle is generated for the new element. In an embodiment, S440 includes allocating a new handle sequence number. The new handle includes the new handle sequence number and a clone identifier of the parent element.

At S450, a hash bucket of the global hash table is locked to allow room for adding a hash table block for the new element.

At S460, the new handle and a name of the new element are written to a content block. In an embodiment, S460 includes identifying the content block based on the identified bitmap block. If S460 requires overwriting the identified content block, S460 also includes setting a pointer to a most recent update (e.g., a snapline) to the content block. If S460 requires writing to a new content block, a content block is allocated.

At S470, a new hash table block is created and stored in the locked hash bucket. A pointer to the parent element is set in the new hash table block.

At S480, the locked hash bucket is unlocked. At S490, the locked bitmap blocks are updated and unlocked.

Figure 5:
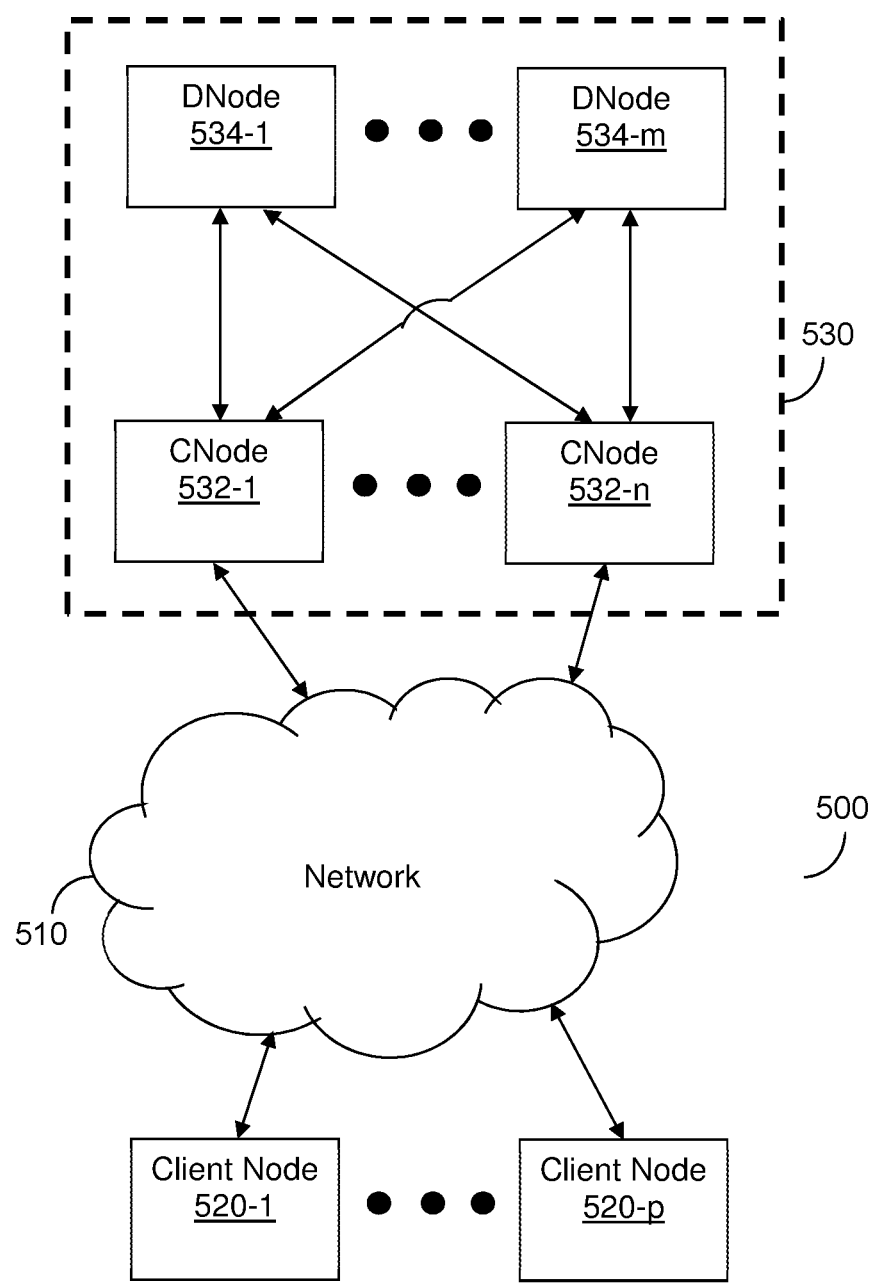
FIG. 5 is a network diagram utilized to describe various disclosed embodiments.

FIG. 5 is a network diagram 500 utilized to describe various disclosed embodiments. The network diagram 500 includes a distributed storage system 530, a network 510, and client nodes 520-1 through 520-*p* (referred to as a client node 520 or as client nodes 520 for simplicity).

The distributed storage system 530 includes compute nodes 532-1 through 532-*n* (referred to as a CNode 532 or as CNodes 532 for simplicity) and storage nodes (DNodes) 534-1 through 534-*m* (referred to as a DNode 534 or as DNodes 534 for simplicity). The distributed storage system 530 may be configured as described further in U.S. patent application Ser. No. 16/002,676, assigned to the common assignee, the contents of which are hereby incorporated by reference.

The network 510 may be, but is not limited to, a wireless, cellular or wired network, a local area network (LAN), a wide area network (WAN), a metro area network (MAN), the Internet, the worldwide web (WWW), similar networks, and any combination thereof. The client node 520 may be, but is not limited to, a server, a personal computer, a laptop, a tablet computer, a smartphone, or any other device configured to store data, access data, or both.

The DNodes 534 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof.

The CNodes 532 are configured to translate access commands into formats supported by the DNodes 534. Example protocols supported via translation by the CNodes 532 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. Because the CNodes 532 are configured to translate access commands into a format that is supported by the protocol of the DNodes 534, support for new protocols may be added by configuring the CNodes 532 with translation rules for the new protocols. The translation rules may include rules for converting access commands in a received format into a format that is compatible with the protocol supported by the DNodes 534.

The CNodes 532 collectively act as a distributed transaction manager for accessing data in the DNodes 534. As the CNodes 140 do not store the data to be accessed by client nodes or the metadata used for navigating to locations in the DNodes 534, such data and metadata do not need to be recovered when one or more of the CNodes 532 fails. Additionally, CNodes 532 may be added or removed without disrupting data stored in the storage system 530. An example schematic diagram of a CNode 532 is described herein below with respect to FIG. 6.

The client node 520 is configured to send access commands to the distributed storage system 530 via the network 510. The CNodes 532 are configured to receive access commands from the client nodes 520 and to access the DNodes 534 based on the received commands. The access may include translating the received commands into a format supported by the DNodes 534. As shown in FIG. 5, each CNode 532 may access all DNodes 534. As a non-limiting example, NVM Express (NVMe) over Fabrics may be utilized to enable such access.

In an embodiment, the access includes navigating element trees stored in the DNodes 534 (e.g., the element trees of the element store 110, FIG. 1) to access data in data blocks stored in the DNodes 534 (e.g., the data blocks 120, FIG. 1). The CNodes 532 are configured to navigate the element trees to read the data blocks 120 and to modify the element trees by, for example, splitting blocks, merging blocks, and the like. To this end, the CNodes 532 may be configured to allocate new blocks, write data to blocks, read data from blocks, add and remove pointers in blocks, and the like.

Each element tree is a tree of metadata blocks as described herein above with respect to FIGS. 1 and 3 that represents an element. An element is a persistent metadata structure that is remote from the CNodes 532 and is used to access the metadata. Each element includes at least an attribute store (not shown) including metadata blocks storing attributes. Each attribute has a key and corresponding value. The attributes may include different types of values such as, but not limited to, identifiers (i.e., pointers to other locations), size, time of last access, access control lists (ACLs), application-specific uses (e.g., identifying an object for S3), and the like. Once created, the elements allow for reading of the data blocks regardless of the protocol of the command which triggered its creation, for example, a S3 write request may trigger creation of an element for the data blocks while the data blocks can be read based on a NFS read request.

At least some of the attributes are pointers to other locations. A pointer attribute may have a <key,value> of <name,identifier>, where the identifier is either a handle of an element or an identifier of a physical location in one of the DNodes 534. Each metadata block may have multiple pointers, at least some of which point to other metadata blocks, thereby creating a tree or buckets. A pointer attribute that acts as a pointer to another metadata block is a link, which allows for navigation among metadata blocks for an element. The metadata block that is pointed to by a link may be stored in another device (e.g., in a device of a different DNode 534).

In some implementations, one or more of the metadata blocks may store an immediate value rather than a pointer to a location in the DNodes 534. The immediate value includes data that would otherwise be stored in the data blocks 120, FIG. 1. As a non-limiting example, the data blocks may be stored in a metadata block when the size of the data block is less than 1 kilobyte.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

In an embodiment, at least a portion of the data blocks may be temporarily included in the elements and stored in, for example, 3D Xpoint memory of the DNodes 534 before being migrated from the 3D Xpoint memory to Flash memory of the DNodes 534. When the data is migrated to the Flash memory, the pointers of the elements which had stored the migrated data may be updated to point to the location of the migrated data in the Flash memory. The temporary storage of the data blocks allows for manipulating the data blocks (e.g., via encoding, data reduction, etc.) in the 3D Xpoint memory before migrating the data blocks to the Flash memory.

Figure 6:
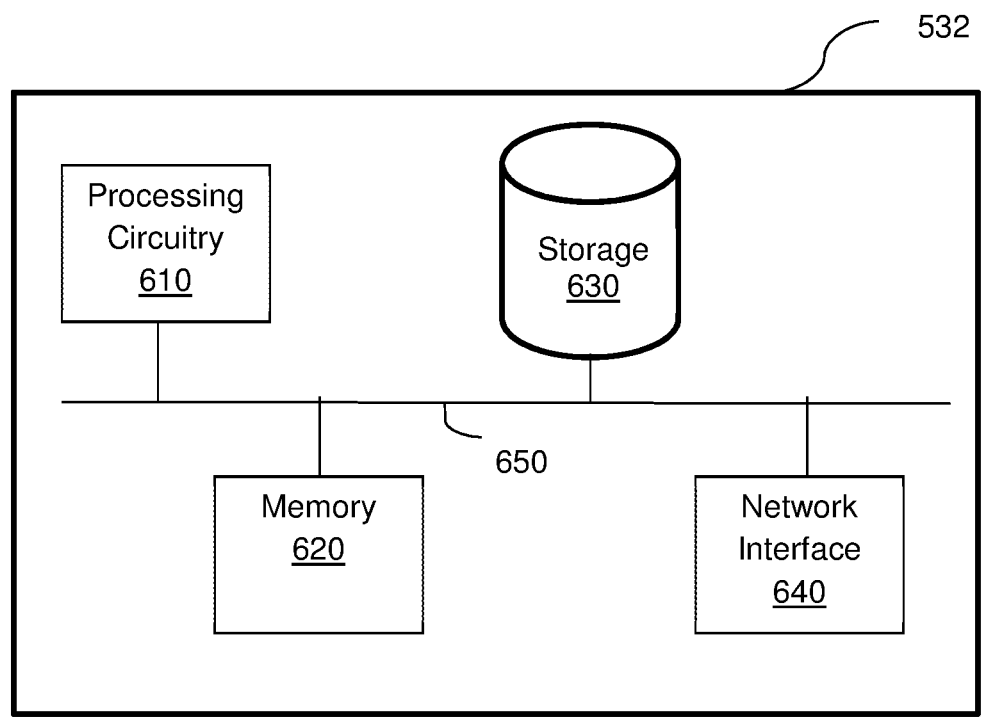
FIG. 6 is a schematic diagram of a compute node according to an embodiment.

FIG. 6 is a schematic diagram of a CNode 532 according to an embodiment. The CNode 532 includes a processing circuitry 610, a memory 620, a storage 630, and a network interface 640.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.) memory. In an embodiment, the memory 620 is configured to store software for execution by the processing circuitry 610. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various processes described herein.

The storage 630 may be magnetic storage, optical storage, and the like, and may be realized, for example, as flash memory or other non-volatile memory technology, CD-ROM, Digital Versatile Disks (DVDs), or any other non-transitory computer readable medium which can be used to store the desired information. The storage 630 may store the instructions for transfer to and storage in the memory 620 for execution by the processing circuitry 610.

The network interface 640 allows the CNode 532 to receive access commands and send data over the network 510, FIG. 5.

It should be understood that the embodiments described herein are not limited to the specific architecture illustrated in FIG. 6, and other architectures may be equally used without departing from the scope of the disclosed embodiments.

Figure 7:
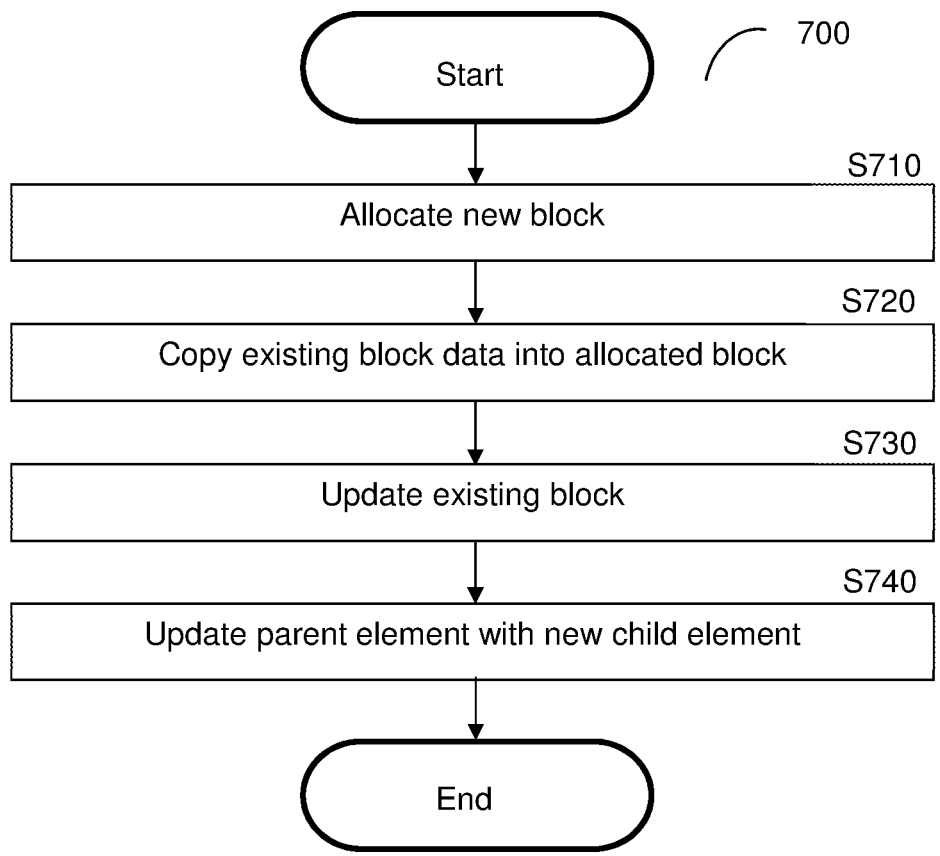
FIG. 7 is a flowchart illustrating a method for splitting a block according to an embodiment.

FIG. 7 is an example flowchart 700 illustrating a method for splitting data blocks having element trees according to an embodiment. The method of FIG. 7 may be utilized to create room for new data when an existing block runs out of space. For example, when one of the metadata blocks of FIG. 1 runs out or is about to run out of space, the metadata block may be split to allow for addition of more metadata.

At S710, a new block is allocated. At S720, half of the existing block's data is copied into the new block. At S730, the existing block is updated by removing the copied data and adding a pointer to the new block. At S740, a parent element tree including the existing block is updated with a child element tree including the new block. The updating may include creating a new element tree as described herein above with respect to FIG. 4.

The various embodiments disclosed herein can be implemented at least partially via software. The software is preferably implemented as an application program tangibly embodied on a program storage unit or computer readable medium consisting of parts, or of certain devices or combinations of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A storage system, comprising:
   a data store including a plurality of data blocks; and
   an element store, the element store including a plurality of element trees, wherein each element tree includes a plurality of metadata blocks containing pointers, wherein each pointer points to one of the plurality of metadata blocks or to one of the data blocks, wherein data of the plurality of data blocks is read by navigating at least one of the plurality of element trees, wherein the element store has a bottom level including a plurality of content blocks, wherein each content block is one of the metadata blocks including a pointer to one of the data blocks.

2. The storage system of claim 1, wherein the bottom level of the element store is shared among the plurality of element trees.

3. The storage system of claim 1, wherein the plurality of metadata blocks is allocated from a shared pool of metadata blocks.

4. The storage system of claim 1, wherein each element tree represents an element that is assigned a handle, wherein the plurality of metadata blocks include, for each element, a metadata block including the handle for the element.

5. The storage system of claim 1, further comprising:
   a plurality of storage nodes, wherein the data blocks and the metadata blocks are stored in the plurality of storage nodes, wherein the element store has a top level including a global hash table, wherein the global hash table is distributed among the plurality of storage nodes.

6. The storage system of claim 1, wherein the plurality of metadata blocks further includes a plurality of hash table blocks, a plurality of range blocks, and a plurality of bitmap blocks, each hash table block pointing to at least one of the plurality of range blocks, each range block pointing to at least one set of bitmap blocks of the plurality of bitmap blocks, each bitmap block pointing to one of the plurality of content blocks, each content block pointing to one of the plurality of data blocks.

7. The storage system of claim 6, wherein the element store has a top level including a global hash table, wherein the global hash table includes a plurality of buckets, wherein each bucket is a composite block including contents of at least two of the plurality of metadata blocks, wherein data in each composite block is read using a single input/output operation.

8. The storage system of claim 7, wherein each composite block includes at least one of the plurality of hash table blocks, at least one of the plurality of range blocks, and at least one of the at least one set of bitmap blocks.

9. The storage system of claim 8, wherein reading each composite block results in identifying one of the plurality of content blocks.

10. The storage system of claim 6, further comprising:
    at least one first storage including the plurality of hash table blocks, the plurality of range blocks, and the plurality of bitmap blocks; and
    at least one second storage including the plurality of content blocks.

11. The storage system of claim 10, wherein each first storage is XPoint storage, wherein each second storage is Flash storage.

12. The storage system of claim 6, wherein each bitmap block further includes a timestamp generated based on a global counter for the storage system, wherein incrementing the global counter includes creating a snapline for the element store, wherein the snaplines are used to create snapshots of the storage system at different points in time.

* * * * *